United States Patent [19]
Cusack

[11] 4,326,830
[45] Apr. 27, 1982

[54] SIDE LOADING VEHICLE

[76] Inventor: Lawrence B. Cusack, 2495 Rosewood Ave., Kamloops, British Columbia, da, V2B 4Z3

[21] Appl. No.: 147,108

[22] Filed: May 6, 1980

[30] Foreign Application Priority Data

May 15, 1979 [GB] United Kingdom ............... 16915/79

[51] Int. Cl.³ ............................ B60P 1/16; B60P 1/32; B60P 1/34; B60P 1/52

[52] U.S. Cl. ..................................... 414/470; 414/471; 414/491; 414/534; 414/535; 414/544

[58] Field of Search ............... 414/470, 471, 491, 495, 414/501, 507, 508, 518, 534, 535, 544, 540, 542, 629, 631, 632, 641, 667, 671

[56] References Cited

U.S. PATENT DOCUMENTS

| | | | |
|---|---|---|---|
| 2,929,524 | 3/1960 | Carlson et al. | 414/632 |
| 2,998,891 | 9/1961 | Baur et al. | 414/608 |
| 3,235,105 | 2/1966 | Loomis | 414/544 |
| 3,684,114 | 8/1972 | Cosgrove et al. | 414/622 |
| 3,822,804 | 7/1974 | Bowman-Shaw | 414/631 |

*Primary Examiner*—James L. Rowland
*Attorney, Agent, or Firm*—Carver & Co.

[57] ABSTRACT

A self-propelled, side loading vehicle comprises a chassis supported on front and rear pairs of wheels and having three box-shaped sections separated by two transversely elongate clear ways extending from one side of the chassis to a rigid frame along a side of the chassis opposite the one side. Three mast members are received on guide tracks mounted on the chassis and have means for independent transverse movement within the two clear ways and along one end of the chassis, each mast member comprising upper and lower telescopic sections and a fluid cylinder for raising and lowering the upper section. A load-bearing assembly is supported by the upper section of each mast member and comprises an outwardly extending bracket connected to a roller chain, the chain extending about a powered sprocket for raising and lowering the bracket connected to the chain. The bracket has a transversely extending, horizontal roller for supporting a load.

17 Claims, 6 Drawing Figures

SIDE LOADING VEHICLE

BACKGROUND OF THE INVENTION

This invention relates to lumber handling and transporting equipment.

PRIOR ART

In the lumbering industry, one of the major cost factors involves the capital expenditure required for equipment necessary to load and transport logs and the like from cutting sites and to handle finished lumber and the like in storage yards. For example, when handling logs at cutting sites, two pieces of equipment are usually necessary, one to use as a loader and the other to be used for haulage alone. A forklift vehicle is a rubber tired vehicle normally having a set of vertically movable forks projecting from the front end which can be slid under stacks of lumber. Because the forks are mounted at the front of the vehicle, the lumber is transported with the length of the lumber perpendicular to the direction of movement of the vehicle. Thus, a considerable amount of clearance is required in a lumber yard for transporting in this manner. Furthermore, forklift vehicles of this nature are somewhat unstable as the loads carried extend forward of the front wheels of the vehicle.

Conventional loading equipment of the prior art, which includes grapple type loaders and side loading forklifts, also requires considerable steering room to enable the machines to be positioned properly in order that logs or lumber, when loaded on a transport vehicle, extend in a fore and aft direction relative to the vehicle, thus resulting in a considerable loss of loading time.

SUMMARY OF THE INVENTION

According to the invention, a self-propelled side loading vehicle comprises a chassis supported on front and rear pairs of wheels and has three box-shaped sections separated by two transversely elongated clear ways extending from one side of the chassis to a rigid frame along a side of the chassis opposite the one side. Three mast members are received on guide tracks mounted on the chassis and have means for independent transverse movement within the two clear ways and along one end of the chassis. Each mast member comprises upper and lower telescopic sections and a fluid cylinder for raising and lowering the upper section. A load-bearing assembly is supported by the upper section of each mast member and comprises an outwardly extending bracket connected to a roller chain. The chain extends about a powered sprocket for raising and lowering the bracket connected to the chain. The bracket has a transversely extending, horizontal roller for supporting a load.

The loader and transporter of the present invention has its wheels so arranged that the vehicle can be moved sideways or backwards or forwards so as to reduce, considerably, the amount of room normally required for maneuvering.

The present loading and transporting vehicle is essentially a wheeled forklift type vehicle, paired front and rear wheels of which are independently steerable for enabling the vehicle to move sideways as well as in a fore and aft direction and having a body provided with an elongated fore and aft deck and side mounted forklift assembly which can be extended from the vehicle beneath the load, the load then lifted and moved sideways and deposited upon the deck of the vehicle so as to extend in the fore and aft direction.

A detailed description following, related to drawings, gives exemplification of apparatus according to the invention which, however, is capable of expression in means other than those particularly described and illustrated.

DETAILED DESCRIPTION

Figure 1:
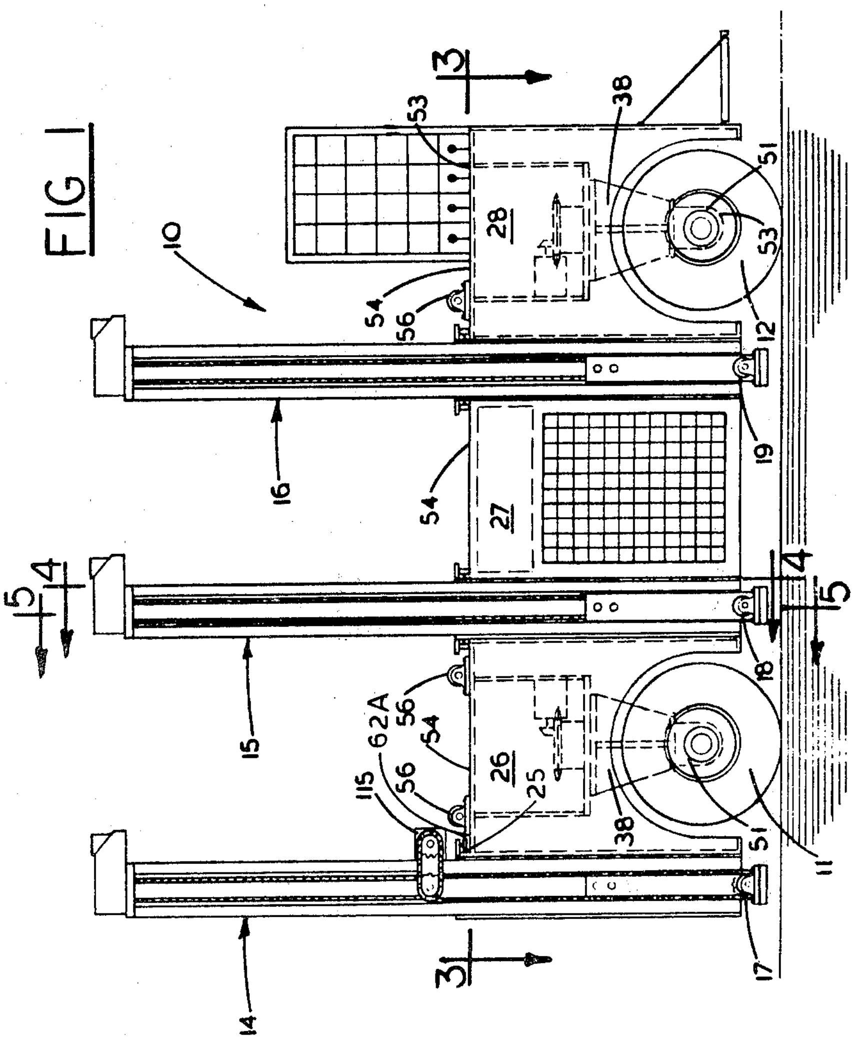
FIG. 1 is a side elevation of side loading vehicle according to an embodiment of the invention.
Figure 2:
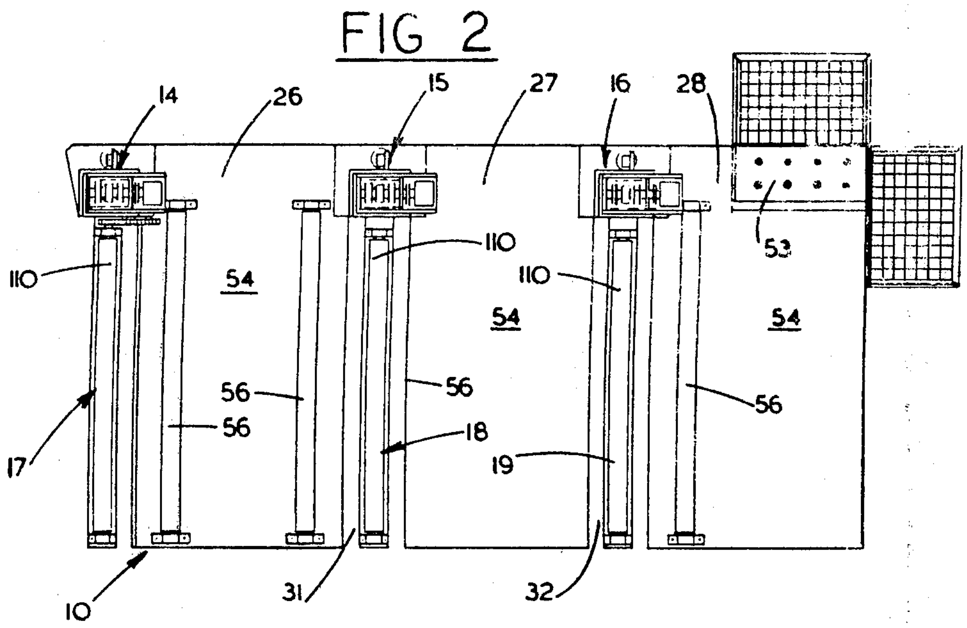
FIG. 2 is a plan view thereof.

Referring to the drawings, and in particular to FIGS. 1 and 2, the self-propelled side loading vehicle according to the invention has, in general, a wheeled chassis 10 having front and rear wheel pairs 11 and 12, respectively. The chassis supports three independently operable, telescopically extendable and retractable, and laterally moveable masts 14, 15 and 16 and the masts themselves support load bearing assemblies 17, 18 and 19 for vertical movement.

Referring to FIGS. 1 through 4, the chassis 10 has a main side frame 22 which is rigidly formed of a plurality of longitudinally extending and interconnected box sectioned members, generally 24. The box sectioned members are preferably welded together to form a strong non-flexible frame. The chassis, it is seen, is divided into three longitudinally spaced apart box shaped sections 26, 27 and 28, each of which is formed of box sectioned members, not shown, which extend transversely of the chassis and are secured at their ends preferably by welding to the main frame 22. The main frame 22 and the framing members forming the sections constitute the entire rigid frame. This construction it is seen, provides a transversely elongated clear way 31 between sections 26 and 27 and a similar way 32 between sections 27 and 28. The clear ways extend from one side of the chassis to the frame 22 on the opposite side. The center section 27 is formed as an engine compartment for an internal combustion engine 35 which drives a hydraulic pump 37.

Figure 3:
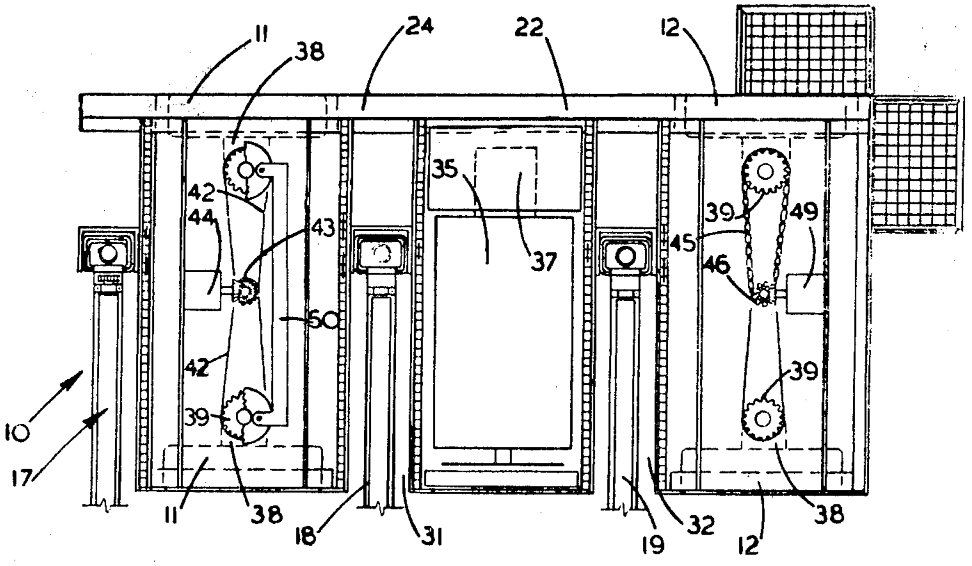
FIG. 3 is a partial section taken on Line 3—3 of FIG. 1.

Referring to FIGS. 1 and 3, the wheels of the wheel pairs are individually mounted. Each wheel, it is seen, is mounted on a vertical support 38 rotatable about a vertical axis, each support having at its upper end a chain sprocket 39. The sprockets of the front wheel pairs are driven by roller chains 42 which are trained over sprockets 43 driven by a drive mechanism comprising a hydraulic steering motor 44. Similarly, the rear wheel pairs are steered through chains 45, trained over sprockets 46, the latter sprockets being driven by a hydraulic motor 49. A tie rod 50 interconnects the vertical supports of each wheel pair, but is illustrated for the front wheels only. The wheels of each wheel pair are independently driven by hydraulic drive motors 51, as shown in phantom in FIG. 1, the latter being driven by hydraulic fluid supplied by the pump 37 and controlled by an operator at a control console 53 on box shaped section 28. Each steering mechanism should permit steering of each wheel through an angle of at least 180° for easy maneuverability of the vehicle and to permit lateral movement to fit into tight spaces or to pick up loads. The illustrated mechanism is capable of permitting steering through an angle of 240°.

The three sections 26, 27 and 28 of the chassis, see FIGS. 1 through 3, provide a flat top deck 54 on which are mounted transversely extending rollers, generally 56. These rollers have drive means comprising suitable hydraulic motors, not shown, which can be controlled by the operator at his console.

Figure 4:
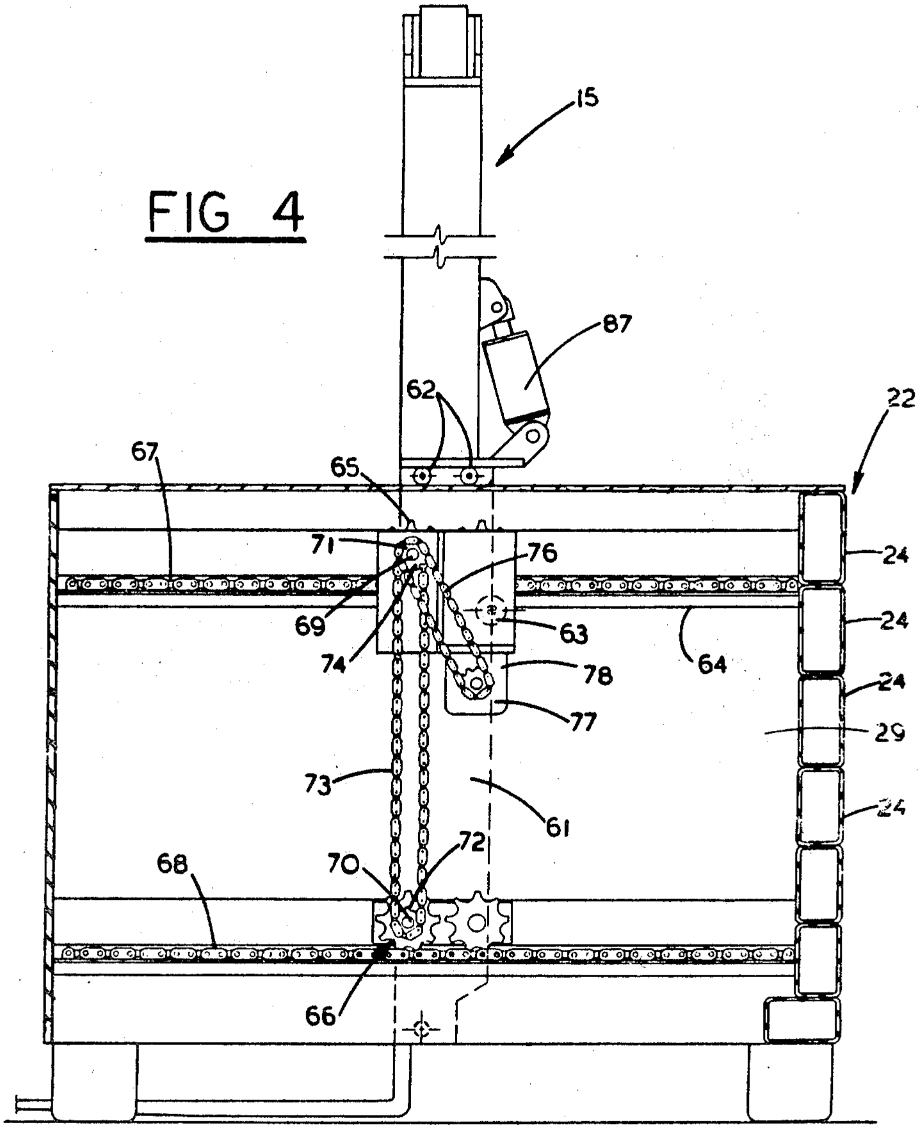
FIG. 4 is a sectional view taken on Line 4—4 of FIG. 1.
Figure 5:
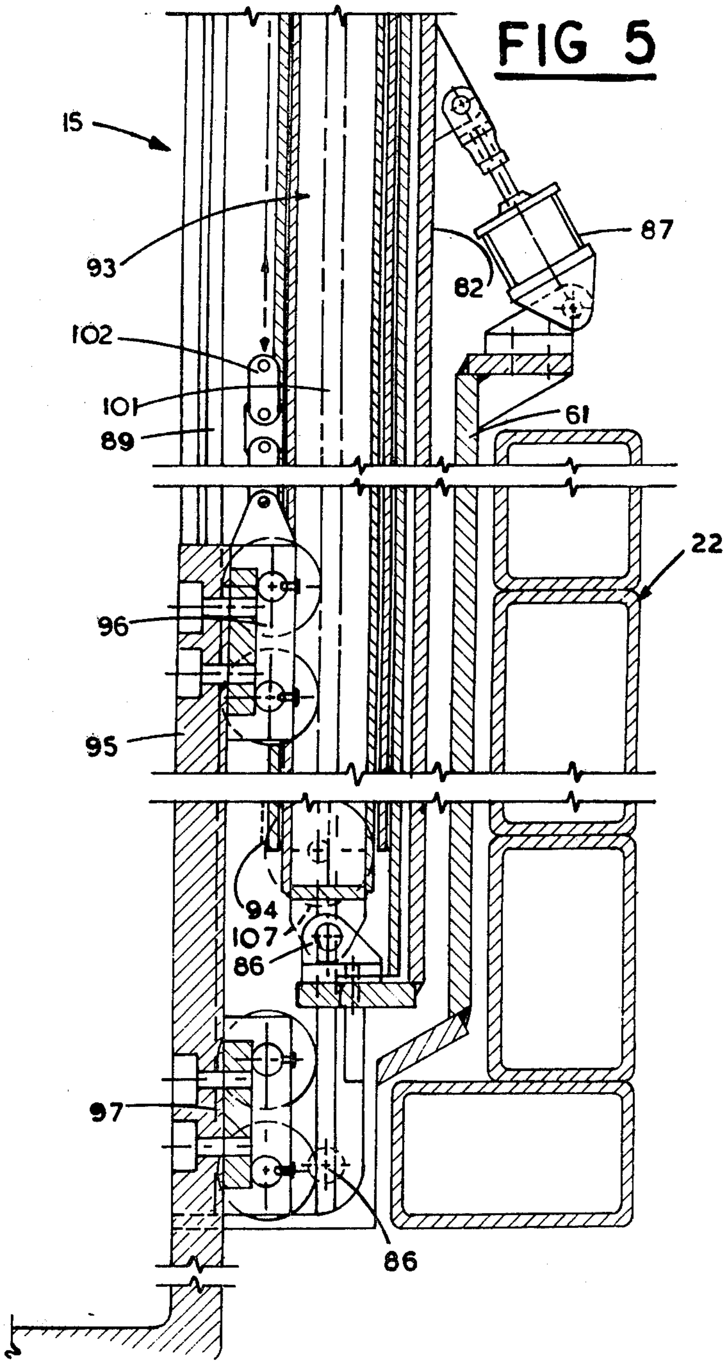
FIG. 5 is a sectional view of Line 5—5 of FIG. 1 showing only a mast and a portion of the vehicle frame.
Figure 6:
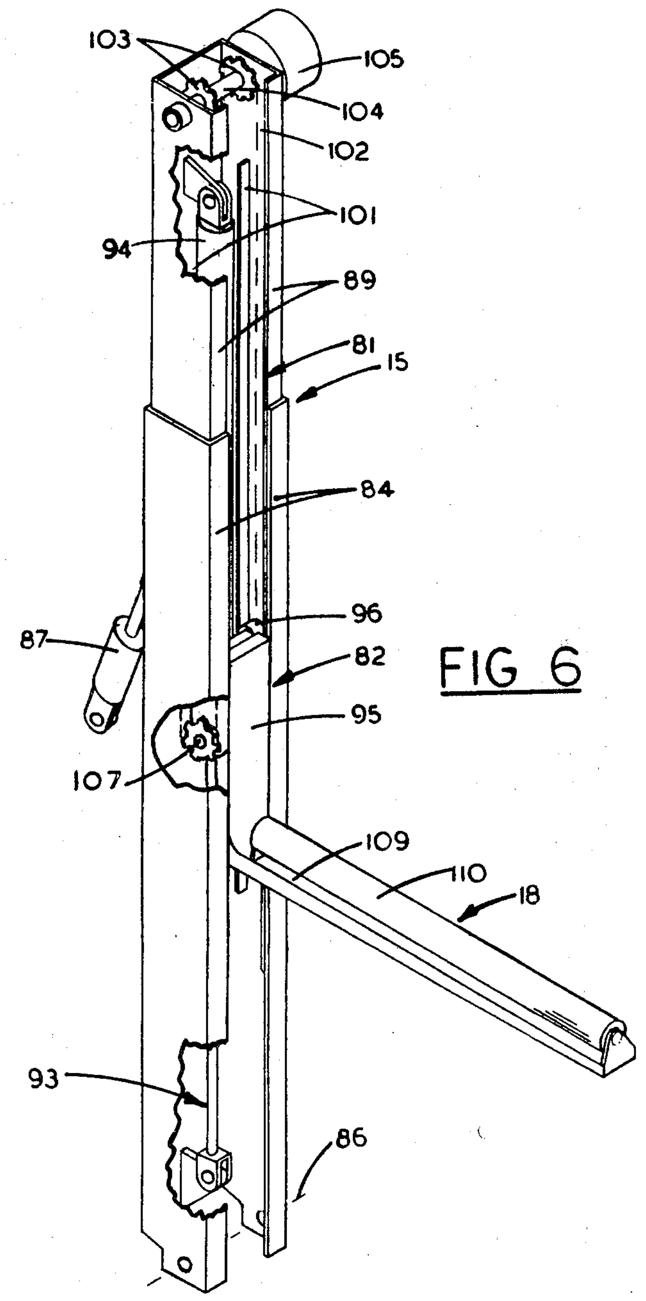
FIG. 6 is an isometric view of the mast shown in FIG. 5.

The mast 15, see particularly FIGS. 4, 5 and 6, has a vertically elongated U-shaped carrier 61 supported for transverse movement within the way 31 by rollers 62, see FIG. 4, which make rolling contact with guide tracks mounted on the chassis comprising the deck of sections 26 and 27. Since they are on one side of mast 14 only, rollers 62A rotate about vertical axes while making rolling contact with the vertical track 25 formed by an upwards extension of the end plate of the chassis. Hold down rollers 63, on opposite sides of the carrier, run beneath tracks 64, also secured to the sections 26 and 27, to prevent vertical displacement of the carrier. Mounted on opposite sides of the carrier are upper and lower sprocket pairs 65 and 66 which engage vertically spaced-apart upper and lower horizontal roller chains 67 and 68, fixedly mounted on a vertical wall 29 within a clear way or, in the case of mast 14, at the end of the chassis. One each of the upper and lower sprocket pairs have drive shafts 69 and 70 upon which co-axial drive sprockets 71 and 72 are mounted. The latter sprockets are connected by a continuous roller chain 73 extending thereabout for mutual rotation. The upper one of the drive pairs also has a drive mechanism comprising a third drive sprocket 74 which is connected by a roller chain 76 to a sprocket 77 of a reversible hydraulic motor 78, the latter also being suitably connected by flexible conduits through the control console to the hydraulic pump. Mutual engagement of the upper and lower sprocket pairs, it is seen, not only holds the carrier in a vertical position but enables the carrier, and thus each mast, to be moved transversely and independently from one side of the chassis to the other along chains 67 and 68. Masts 15 and 16 move within clear ways 31 and 32, while mast 14 moves along the end of the chassis opposite box sectioned member 28.

The mast 15 also has upper and lower telescopic sections 81 and 82, respectively. The lower section 82, see particularly FIGS. 5 and 6, is substantially U-shaped having a rectangular cross section and provided with inwardly extending flanges 84—84 and is pivotally mounted for lateral swinging movement at its lower end on a hinge pin 86 at the lower end of the carrier. A double acting hydraulic cylinder 87 controlled through the console extends between the upper end of the carrier and the lower mast section for enabling side to side tilting of the mast relative to the carrier. The upper section of the mast has the same cross sectional configuration as the lower section and has a slidable fit therein. The upper section also has inwardly extending flanges 89—89 and is telescopically extensible and retractable relative to the lower section through the mediacy of a double acting hydraulic jack 93 also controlled through the console. This hydraulic jack 93 is shown in FIG. 6 with the cylinder 94 uppermost. The jack is capable, therefore, of raising and lowering upper section 81 relative to lower section 82.

The upper section 81 of the mast supports the load bearing assembly 18. As particularly shown in FIGS. 5 and 6, the assembly 18 has a vertically disposed carriage 95 having upper and lower roll pairs 96 and 97 which rollably fit between the inwardly extending flanges 89 and vertically extending tracks 101—101 welded to the inner surfaces of the walls of said mast upper section. A pair of roller chains 102—102, which are connected at each end to carriage 95, are trained over a pair of drive sprockets 103—103 mounted on a drive shaft 104 at the upper end of the upper mast section, the shaft being powered by a hydraulic motor 105, operation of which is controlled through the console. These roller chains 102 are also trained over lower sprockets 107–107 mounted for free rotation on the lower end of the cylinder 94 so that positive upwards and downward drive of the carriage is obtained.

An elongated supporting bracket 109 is cantilevered outwards through both upper and lower mast sections from the lower end of the carriage and supports a transversely extending, horizontal roller 110 which is free running. Bracket 109 is connected to carriage 95 and thereby to chains 102. Masts 14 and 16, together with their supporting and moving mechanisms, are the same as described with reference to mast 15. The roller 110 of mast 14 is chain driven by a reversible hydraulic motor 115, shown only in FIG. 1.

In operation, the independently operable and steerable front and rear wheel pairs provide great versatility in movement, enabling the vehicle to move lengthwise or transversely so as to minimize the amount of operating space usually necessary for other types of hauling and loading equipment. Construction of the masts also provides great versatility in loading and unloading, either logs or lumber stacks. The telescoping feature reduces minimum overhead clearance, to gain entry to rail cars, for example, while increasing the maximum lifting height. As the load to be carried can be placed directly on the deck of the machine, the load machine is in balance at all times. Further, although the loader and transporter can be unloaded in the same manner as it is loaded, it can also be unloaded very quickly by moving the load off the deck by operating the rollers mounted thereon. Further, the rollers on both the masts and the deck enable the load to be shifted for balance purposes.

What is claimed is:

1. A self-propelled side loading vehicle comprising:

(a) a chassis supported on front and rear pairs of wheels and having three box shaped sections separated by two transversely elongate clear ways extending from one side of the chassis to a rigid frame along a side of the chassis opposite the one side;

(b) three mast members received on guide tracks mounted on the chassis and having means for independent transverse movement within the two clear ways and along one end of the chassis, each mast member comprising upper and lower telescopic sections and a fluid cylinder for raising and lowering the upper section; and (c) a load-bearing assembly supported by the upper section of each mast member comprising an outwardly extending bracket connected to a roller chain, the chain extending about a powered sprocket for raising and lowering the bracket connected to the chain, the bracket having a transversely extending, horizontal roller for supporting a load.

2. A vehicle as claimed in claim 1, the chassis having a flat top deck with transversely extending rollers mounted thereon and drive means for said chassis mounted rollers.

3. A vehicle as claimed in claim 1 comprising drive means for the roller on one said mast member.

4. A vehicle as claimed in claim 1, the chassis having vertical walls within the clear ways and at one end, the means for independent movement of each mast member comprising a pair of vertically spaced-apart, horizontal roller chains fixedly mounted on the said wall, upper and lower sprockets engaging the pair of roller chains, drive sprockets co-axially mounted on the upper and lower sprockets, a continuous roller chain extending about the drive sprockets for mutual rotation of the sprockets and a drive mechanism for rotating the sprockets so that each mast member moves transversely along the pair of chains.

5. A vehicle as claimed in claim 1, each said mast member comprising a carrier member, the lower telescopic member being pivotally mounted on the carrier near the lower end thereof, and a fluid cylinder interconnecting the carrier member and the lower member for tilting the telescopic members.

6. A vehicle as claimed in claim 1 comprising independent steering mechanisms for the front and rear wheel pairs.

7. A vehicle as claimed in claim 6, the steering mechanisms comprising a vertical support for each wheel rotatable about a vertical axis, a chain sprocket on each of the vertical supports, roller chains connecting the sprockets of the vertical supports to a drive sprocket for each said pair of wheels and a drive mechanism for rotating the drive sprockets.

8. A vehicle as claimed in claim 7 comprising tie rods connecting the vertical supports of each said pair of wheels.

9. A vehicle as claimed in claim 6 or claim 8, the steering mechanism permitting steering of each wheel through an angle of at least 180°.

10. A vehicle as claimed in claim 6 or claim 8, the steering mechanism permitting steering of each wheel through an angle of 240°.

11. A vehicle as claimed in claim 1, a central said box shaped section of the chassis forming an engine compartment for the vehicle.

12. A vehicle as claimed in claim 1, one said box shaped section adjacent an end of the chassis opposite the one end including a control console for the vehicle.

13. A vehicle as claimed in claim 4, the chassis having a flat top deck and the mast members within the clear ways having rollers on each side thereof making rolling contact with the deck.

14. A vehicle as claimed in claim 13, the chasis having a vertical track comprising an upwardly extended end plate at said one end, the mast member adjacent the one end having rollers making rolling contact with the vertical track.

15. A vehicle as claimed in claim 13 comprising lower guide tracks on the vertical walls of the clear ways below the deck, the masts within the clear ways having hold-down rollers below the lower guide tracks and making rolling contact therewith.

16. A vehicle as claimed in claim 5, the carrier members and telescopic sections being elongate, U-shaped members.

17. A self-propelled side loading vehicle comprising:

(a) a chassis with a flat top deck supported on front and rear pairs of wheels and having three box shaped sections separated by two transversely elongate clear ways extending from one side of the chassis to a rigid frame joining the three box shaped sections, the frame being on a side of the chassis opposite to the one side, controls for the vehicle being on the box shaped section at one end of the chassis, a motor and hydraulic pump for powering the vehicle being housed in the central box shaped section, the chassis having vertical walls within the clear ways and at said opposite end, a pair of vertically spaced apart, horizontal roller chains being mounted on each vertical wall, and transversely extending, horizontal rollers rotatably mounted on the top deck;

(b) steering mechanisms for the pairs of wheels comprising a vertical support for each wheel rotatable about a vertical axis, a chain sprocket on each vertical support, continuous roller chains connecting the sprockets of the vertical supports to a drive sprocket of each said pair of wheels and a hydraulic steering motor coupled to each drive sprocket;

(c) hydraulic drive motors connected to the wheels for rotation thereof;

(d) three mast members, each comprising an elongate U-shaped carrier having rollers in rolling contact with a guide track on the chassis for independent transverse movement between the two clear ways and along the end of the chassis opposite the one end, each mast member having upper and lower sprockets engaging one of the pairs of horizontal roller chains on the vertical walls of the chassis, drive sprockets coaxially mounted on the upper and lower sprockets, a continuous roller chain extending about the drive sprockets and a fluid motor operatively connected to the sprockets for rotation thereof and said transverse movement of the mast member, each mast member having upper and lower elongate U-shaped telescopic sections, the lower section and the carrier being pivotally connected near lower ends thereof for lateral pivoting of the telescopic sections relative to the chassis, and a fluid cylinder connecting the telescopic sections and the carrier for said lateral pivoting; and (e) a load bearing assembly supported by the upper section of each mast member comprising an outwardly extending bracket member having a transverse roller rotatably mounted thereon, guide rollers for following vertical guide tracks within the upper mast section, a powered sprocket near the top of the upper section and an idler sprocket near the bottom of the upper section, a roller chain extending about the sprockets of the upper mast section, the bracket member being connected to the roller chain of the mast member for vertical movement of the bracket member.

* * * * *